United States Patent [19]

Springer

[11] 4,031,739
[45] June 28, 1977

[54] AUTORANGING METHOD AND SYSTEM FOR TESTING THE SPEEDS OF A CAMERA SHUTTER

[76] Inventor: Barry R. Springer, 35 Northwood Drive, Nashua, N.H. 03060

[22] Filed: July 22, 1976

[21] Appl. No.: 707,573

[52] U.S. Cl. .................................. 73/5; 324/186
[51] Int. Cl.² ...................................... G03B 43/02
[58] Field of Search .............. 73/5, 6; 324/181, 186

[56] References Cited
UNITED STATES PATENTS

| | | | |
|---|---|---|---|
| 3,760,629 | 9/1973 | Westharer | 73/5 |
| 3,946,592 | 3/1976 | Ichikawa | 73/6 |

*Primary Examiner*—S. Clement Swisher
*Attorney, Agent, or Firm*—Joseph E. Rusz; Julian L. Siegel

[57] ABSTRACT

A camera shutter tester that automatically displays a standard shutter speed nearest to the actual speed of the shutter being tested and displays a ratio of that speed to the standard speed. A photodetector is placed in the focal plane of the camera that faces a light source and the photodetector's output is threshold detected and a logic circuit generates an initialization pulse. A voltage controlled oscillator dependent upon the photodetector's output feeds a countdown shift register that is in turn fed by a range shift register which also feeds range information to a ratio counter. The initialization pulse activates the range shift register, the countdown register, and the ratio counter. The frequency of the voltage controlled oscillator is divided by the output of the countdown shift register and the new frequency is fed to the ratio counter which in turn delivers a range change pulse to the range shift register. The output of the range shift register and the ratio counter are fed to displays that are latched by the threshold detector.

14 Claims, 4 Drawing Figures

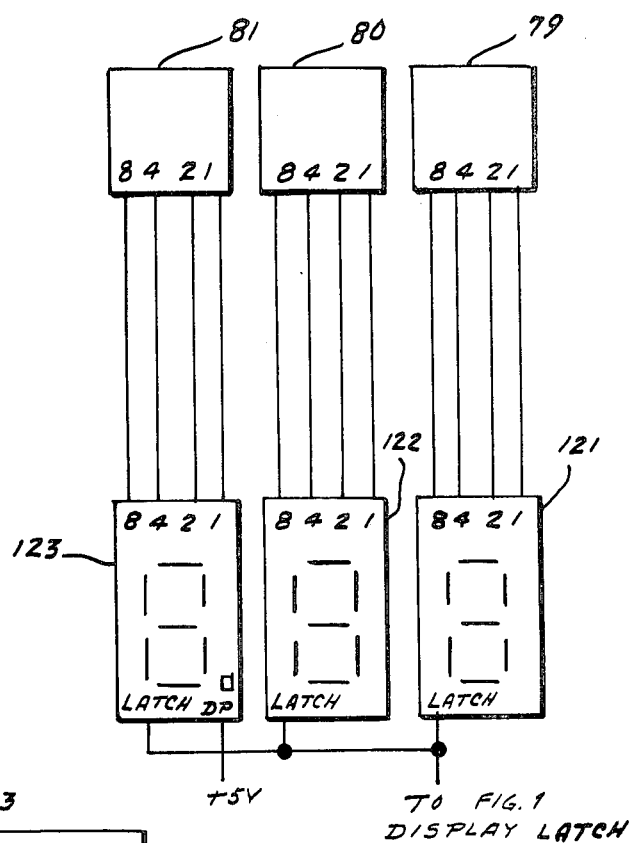
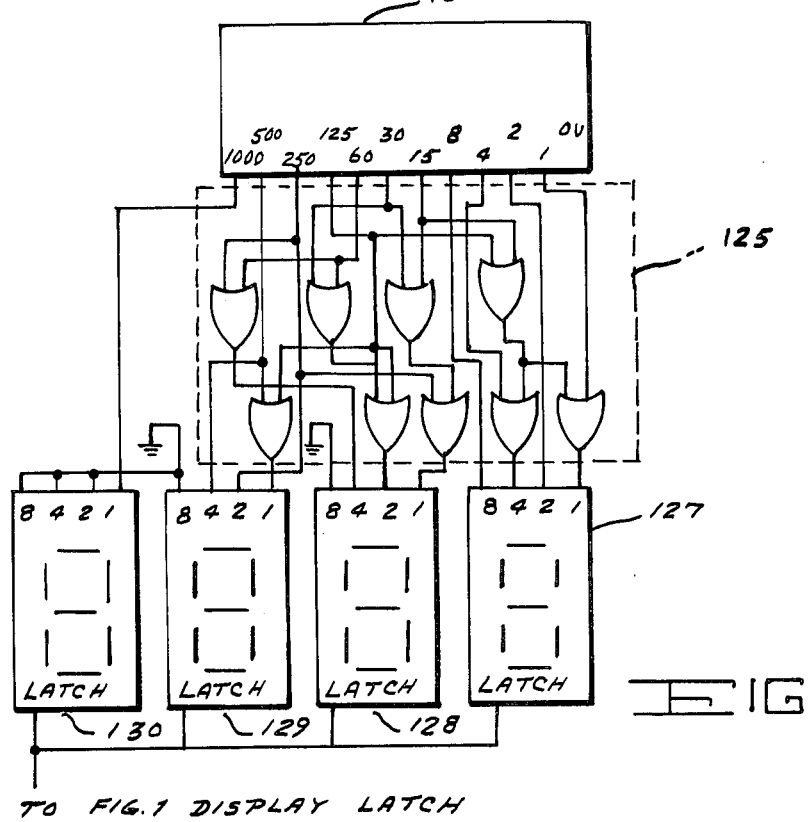

AUTORANGING METHOD AND SYSTEM FOR TESTING THE SPEEDS OF A CAMERA SHUTTER

STATEMENT OF GOVERNMENT INTEREST

The invention described herein may be manufactured and used by or for the Government for governmental purposes without the payment of any royalty thereon.

BACKGROUND OF THE INVENTION

This invention relates to digital photographic electronics, and more particularly to an automatic tester for camera shutter speeds.

There has been increasing interest in the field of camera test instruments to develop more efficient, easier to use test instruments. The advent of digital electronics and the now readily available micrologic packages with complex processing capabilities has spurred the development of more automated and complex, yet easier to use test instruments. There has been a trend to develop such instruments where possible with digital display elements which are easily read and unambiguous in their meaning.

The most recent examples of the prior art as shown by U.S. Pat. No. 3,603,133 and Pat. No. 3,760 issued to Westhaver, and U.S. Pat. No. 3,913,376 issued to Scott, have brought the development of shutter testers into the realm of digital electronic processing and are implemented with fixed frequency time bases gated by a light pulse exceeding a threshold point. Some provision is made in one of the Westhaver patents to manually select several time bases according to the anticipated shutter speed range. The selection of a timing period between the half-open to half-closed shutter operation has provided a workable means to interface the analog light sensing circuitry with the digital counting circuitry.

However, the state of the prior art suffers from two shortcomings which are remedied by the present invention. The display, although digital, presents the shutter speed in milliseconds. Any given reading must be interpreted by hand calculation or look-up table to determine the percentage of error present in the shutter for the set speed. Secondly, the use of threshold timing points at the half-open and half-closed shutter positions, although generally producing accurate effective speed readings for focal plane shutter cameras, may produce erroneous results for cameras with between the lens shutters or with nonlinear opening or closing programmed shutters.

The limitations of the one-half open to one-half closed timing method are discussed in the Nov-Dec. 1974 issue (Vol. 5, No. 6) of the SPT Journal, published by the Society of Photo Technologists. A definition of effective exposure time is also presented which requires a technique of integrating the illuminance curve versus time of the light pulse generated by the camera shutter.

The present invention initiates timing processing when the light level striking the photodetector in the focal plane of the camera exceeds 1 percent of the maximum shutter open light intensity, which has been adjusted during a simple setup operation. Processing continues until the light intensity falls below one percent level again. Timing between these points captures 99.99 percent of the light pulse illuminance curve for processing of the effective shutter speed. The interface between the analog light sensing circuitry and the digital processing circuitry is provided by means of a linear amplifier and voltage controlled oscillator (VCO) combination. By counting the pulses output by the VCO as the shutter operates, the integral of the light intensity versus time illuminance curve of the light pulse is developed. During pretest setup the maximum VCO frequency has been adjusted at full shutter open operation, therefore the timing by this method produce true, effective shutter speed for any camera shutter configuration.

The present invention further processes the VCO output pulse train by means of controllable frequency dividers, presettable shift registers and presettable counters to present the American National Standard Institute (ANSI) standard shutter speed in digital format which most accurately represent the effective shutter speed of the camera shutter tested. An error ratio is also displayed by digital means which directly indicates the performance of the shutter relative to the standard speed displayed.

SUMMARY OF THE INVENTION

The invention is an instrument designed to test the operation of camera shutters. The instrument automatically selects and displays the American National Standards Institute (ANSI) standard shutter speed which most accurately represents the speed of the camera shutter under test and also displays an error ratio relative to that speed. The instrument derives timing for all ranges from a single crystal controlled oscillator which yields high stability and high accuracy for all measurements, and eliminates the need for calibration. Operation of the instrument requires only one adjustment to set the photodetector amplifier gain to produce a 300 KPPS frequency from the VCO when the shutter is at full aperture. With accurate setting of this frequency by heterodyning the VCO with the 300 KPPS reference oscillator, the instrument is limited in accuracy only by the accuracy of the crystal and the number of digits selected for the presettable counter and ratio display. With three digits of ratio display and utilizing a 0.05 percent accuracy crystal, the instrument is capable of one percent accuracy in testing over a range of shutter speeds from 1,000 sec to 10 sec, a 10,000 to 1 ratio of range without requiring manual range selection.

It is therefore an object of this invention to provide a method and system of testing a camera shutter speed by automatically selecting and displaying a standard shutter speed which most accurately represents the speed of the camera under test and at the same time displays the error ratio relative to that speed.

It is another object of the invention to provide a method and system of testing a camera shutter that eliminates the need to preset the test range of the instrument for each speed to be tested.

It is still another object to provide a method and system of testing a camera shutter that eliminates the need for a range selector switch that is subject to high failure rate.

These and other objects, features and advantages of the invention will become more apparent from the following description when taken in conjunction with the illustrative embodiment of the accompanying drawings.

DESCRIPTION OF THE DRAWINGS

FIG. 3 is a schematic diagram describing the connections for displaying the count of the presettable counters;

FIG. 4 is a schematic diagram describing the logic connections for interfacing the range indicating shift register with the digital display.

DETAILED DESCRIPTION OF THE PREFERRED EMBODIMENT

It is understood in the following description and the drawings of the preferred embodiment that numerical values are given only by way of example and these values are not intended to limit the scope of the invention as other numerical values can also be used and still remain within the scope of the invention.

Figure 1:
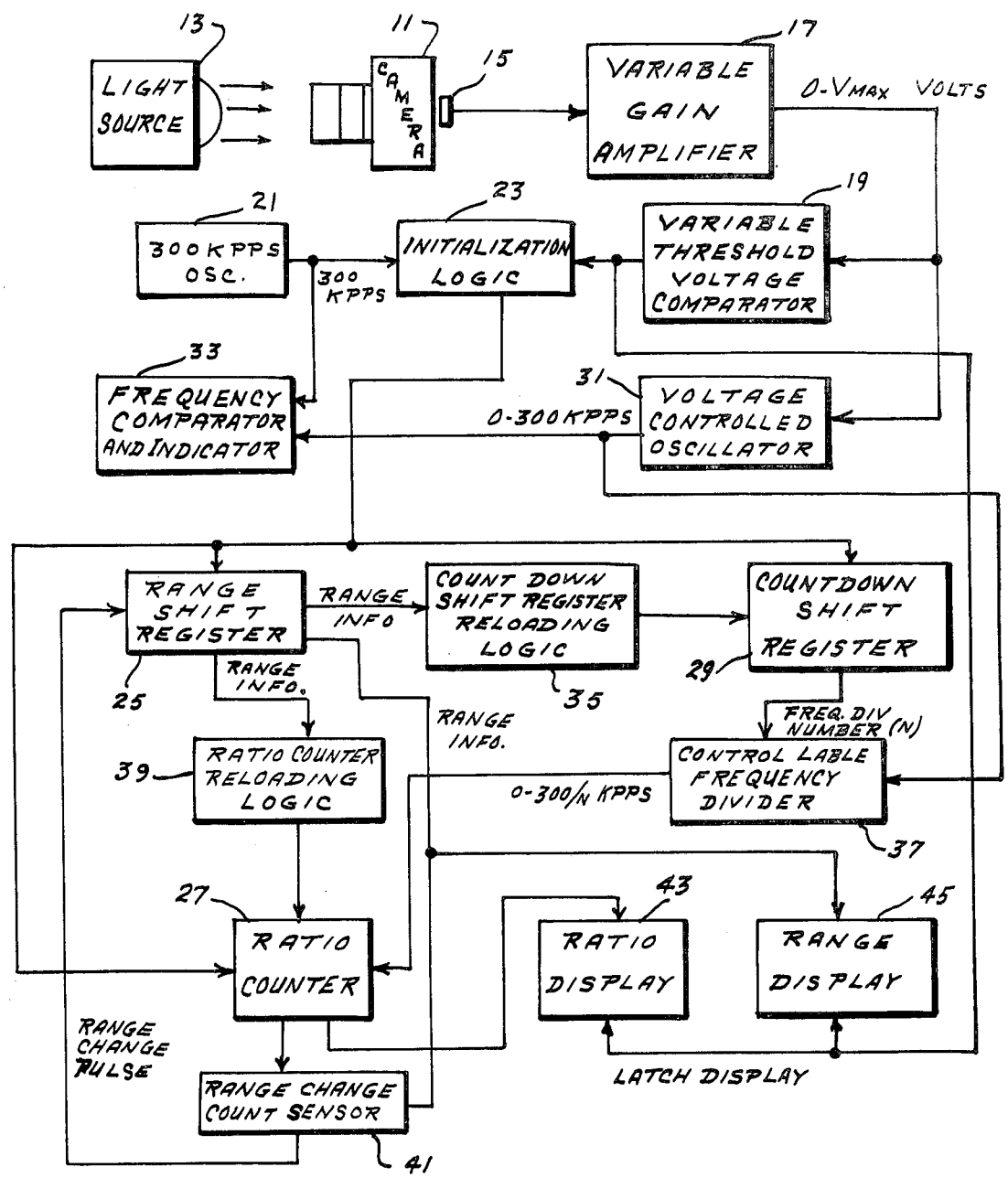
FIG. 1 is a functional block diagram showing an embodiment of the invention.

Referring to FIG. 1 which shows a functional block diagram of the invention, camera 11 is positioned to receive light from light source 13. The light passing through the shutter of camera 11 is detected by photodetector 15 and is fed through variable gain amplifier 17 to variable threshold voltage comparator 19. Oscillator 21 and variable threshold voltage comparator 19 are connected to initialization logic 23 whose signal is fed to range shift register 25, ratio counter 27 and countdown shift register 29. Oscillator 21 and voltage controlled oscillator 31 are fed to frequency comparator and indicator 33. Countdown shift register 29 receives the signal from voltage control oscillator 31 and from countdown shift register reloading logic 35 that obtains range information from range shift register 25. Controllable frequency divider 37 receives a frequency division number ($n$) from countdown shift register 29 and generates a divided frequency that is fed to ratio counter 27. This counter also receives an input from ratio counter reloading logic 39 that has operated upon range information received from range shift register 25. Ratio counter 27 feeds range change count sensor 41 together with the output of range shift register 25 and the output of the range change count sensor is fed back to range shift register 25. Ratio display 43 is fed by ratio counter 27 and range display 45 is fed by range shift register 25. Both displays are latched by the output of variable threshold voltage comparator 19.

Figure 2:
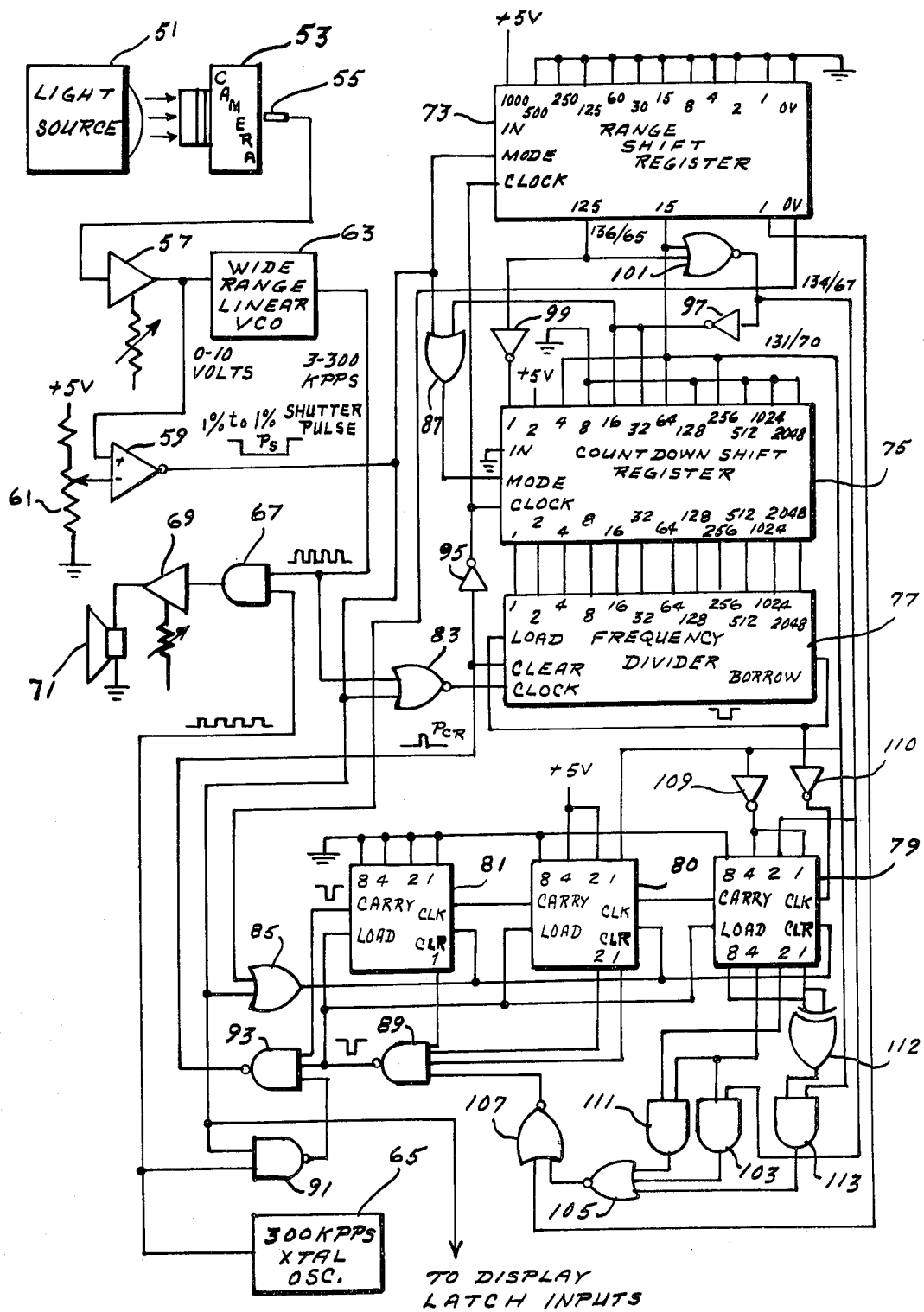
FIG. 2 is a schematic diagram showing the details of the invention presented in FIG. 1.

Referring to FIG. 2 which shows greater detail of the invention, light source 51, preferably a collimated or large area homogeneous source is placed in front of camera 53 to be tested and a fast rise time photodetector 55 is placed in the focal plane of camera 53. Variable gain amplifier 57 converts photodetector output current into a voltage such that when the shutter of camera 53 under test is fully open, the output of amplifier 57 will be approximately 10 volts. Photodetector 55 and amplifier 57 are linear over at least a 100:1 range such that the output of amplifier 57 varies from 0.1 volt to 10 volts in direct proportion to the light intensity striking photodetector 55.

Voltage comparator 59 is set by resistive voltage divider 61 to change from a high state to a low state when the output voltage from amplifier 57 exceeds 0.1 volt or 1 percent of the full range output of the amplifier.

Voltage controlled oscillator (VCO) 63 has linear voltage to frequency conversion characteristics such that it generates a 3 to 300 KPPS square wave output as the input voltage varies from 0.1 volt to 10 volts.

Crystal oscillator 65, gate 67, amplifier 69 and speaker 71 provide a means for adjusting the VCO output to precisely 300 KPPS at full shutter setting. During setup, the shutter is held in the full open position and the gain of amplifier 57 adjusted so that a heterodyne zero beat is heard in speaker 71.

Range shift register 73 and countdown shift register 75 are identical 12 bit binary, parallel input, right shifting registers. Serial inputs on both registers are grounded. The mode control input determines the effect of a clock pulse. When mode is high, a clock pulse causes the 12 bit word on the parallel inputs to be loaded. When mode is low, a clock pulse causes the entire register contents to shift right 1 bit and a 0 bit to be entered in the leftmost bit position. Parallel load inputs appear on the top of the register drawing and outputs on the bottom.

Frequency divider 77 is a parallel load 12 bit binary count down chain. The clear input overrides all other inputs and causes the entire chain to be set to zero states. The load input causes the 12 bit word on the parallel inputs to be loaded into the chain. The clock input causes the binary count in the chain to be decreased by 1 with each clock pulse. When the chain count is zero, a clock pulse causes a pulse to be output on the borrow output of the chain. The borrow output of frequency divider 77 is connected to the load input, thus causing the 12 bit word output by countdown shift register 75 to be reloaded into the divider chain with each borrow pulse. By this connection and the countdown nature of the frequency divider chain, the borrow output represents a pulse train with a frequency equal to the clock input frequency divided by the binary count number represented by the output of countdown shift register 75.

Ratio counters 79–81 are identical BCD presettable up counters. The clear input causes the count to be set to zero. A pulse on the load input causes the binary word present on the inputs drawn on the top of each counter to be loaded into the counter. When the count reaches 9, a clock pulse causes the count to recycle to 0 and a carry pulse to be generated on the carry output.

During periods when the camera shutter is closed the output of amplifier 57 is in a high state. This inhibits the input of VCO 63 to frequency divider 77 by means of gate 83. By means of gate 85, the ratio counters are cleared to all zero counts. The mode input to range shift register 73 is held high directly, and the mode input to countdown shift register 75 is held high through gate 87. Both registers are therefore held in a loading mode. Since ratio counters 79–81 are all in zero states, the output of gate 89 will be high. The carry outputs are normally high and thus the 300 KPPS square wave pulse train will pass through gates 91 and 93 and be applied directly to frequency divider 77 clear input and through inverter 95 to the countdown and range shift registers clock inputs. This will cause the 1/1000 sec range designated bit only on the range shift register 73 to be high and therefore through logic gate 101, inverters 97 and 99, and direct +5 volts and ground connections, will cause an input word of 110000000000 to be loaded into countdown shift register 75. The least significant bit in this register is on the left, hence the 11000000000 bit pattern represents a binary 3.

When the shutter is tripped for a timing, as soon as the 1 percent light intensity level is exceeded, the output of voltage comparator 59 will fall to a low state. This will inhibit the passage of further pulses through gate 91, return the output of gate 93 to a low state and switch the mode inputs to the range and countdown shift registers to the high or right shifting mode.

Control of gate 83 will be released and the VCO 63 output will be applied to the input of frequency divider 77. The first clock pulse input will cause the binary 11000000000 present at the output of countdown shift register 75 to be loaded into the frequency divider countdown chain. The output of VCO 63 will thereafter be divided in frequency by 3. The output of gate 85 will be low, thus ratio counters 79–81 will count up the output pulses from frequency divider 77 borrow output.

When the ratio count reaches 133, this represents an effective open shutter period of $$t = \frac{133 \text{ pulses}}{300{,}000 \text{ pulses/sec} \div 3} = 1.33 \text{ milliseconds}$$

This could be regarded as a 33 percent slow 1/1000 sec shutter operation or a 33.5 percent fast 1/500 sec shutter operation. It is therefore most accurate to identify this as a 1/1000 second shutter operation. When the count reaches 134, however, this represents 34 percent slow 1/1000 sec shutter operation or a 33 percent fast 1/500 sec shutter operation. Now it is most accurate to identify the effective open shutter period as 1/500 sec. At the 134 count, the range will be shifted to 1/500 sec.

All inputs to gate 101 are zero at the 134 count point, thus the line identified as 134/67 is high. The output of gate 103 will become high driving the output of gate 105 low. Since the designated 1 sec range output of range shift register 73 will be low, this will cause the output of gate 107 to rise to high state. Thus, at 134 count, all of the inputs to gate 89 will be high for the first time, causing the gate 89 output to go low. This will immediately cause the load inputs to ratio counters 79–81 to be activated loading the counts then present on their preset inputs. Since the designated 1/125 sec and 1/15 sec bit outputs of range shift register 73 will be low at this time, through gate 101, inverter 109 and direct +5 V and ground inputs, a BCD count of 067 will be present on the ratio counters preset inputs. Upon loading the 067 BCD count, the inputs to gate 89 will no longer all be high thus gate 89 output will again rise. Therefore, immediately upon reaching a 134 ratio count, a pulse is generated at the output of gate 89 and a BCD 067 count is loaded into ratio counters 79–81. This pulse, designated as range change pulse, $P_{cr}$, is propagated through gate 93 to clear the frequency divider chain and through inverter 95 to present a clock pulse to register 73 and 75. Since they are in the right shift mode, both registers right shift 1 bit with this range change pulse. Now, only the designated 1/500 sec range bit is high on register 73, and register 75 presents a 011000000000 binary bit pattern to the controllable frequency divider parallel inputs. The on the next clock pulse frequency divider chain 77 loads this count and frequency divider 77 is now counting down at a divide by 6 rate. The ratio chain now counts up from its preset 067 rate frequency BCD count.

A similar count up to 134 ratio count, reset to 067 count and change range operation occurs through 1/500 to 1/250 sec range change and the 1/250 to 1/125 sec range change with attendant doubling of the countdown division number with each range change.

When the then current range is 1/125 sec, indicated by the designated 1/125 sec range bit high on register 73, a slightly different range change process occurs. Through gate 101, the line designated 134/67 is now low. This disables gate 103 and now the count must reach 136 before any of the three trigger gates 103, 111 or 113 is satisfied. At 136 count, the output of gate 111 is high causing, through gates 105 and 107, gate 89 inputs to be satisfied. This causes a range change pulse to be generated at the output of gate 89. Since the designated 2 bit input to ratio counter stage 79 is low, a BCD count of 65 instead of 67 will be loaded. Since only the 1/125 sec bit of register 73 will be high, through gate 101 and inverters 97 and 99, a binary word of 010001100000 will be present on the input of register 75. Through gate 87, the mode control input to register 75 will be high, thus register 75 will be in a load mode. The range change pulse will then cause register 75 to be loaded with a 010001100000 binary 50 count. The frequency counter will thereafter be in a divided by 50 mode and the ratio counters will count up the borrow output pulses from the 065 BCD count.

The 1/60 to 1/30 range change and the 1/30 to 1/15 sec range change will be as described for a 134/67 range change.

When the range is 1/15 sec, gate 89 inputs are first satisfied at a 131 count through gate 113, gate 105 and gate 107. Since the line designated 131/70 is high, inverter 109 and the other inputs to the ratio counters cause a 070 BCD count to be loaded as the range changes over to 1/8 sec. A binary count of 111011101000, or 375 is loaded into countdown shift register 75 during this range change operation.

The remaining range change and preset loads are of the 134/67 type up to the point when the 1 sec range is reached. When the 1 sec range bit on register 75 is high, the generation of any further range change pulses by gate 89 is inhibited by gate 107. The ratio counter will continue to count up until a 999 count is reached. When the ratio counter clocks over to 000 count, a carry pulse is generated and input to gate 91. This causes gate 91 to generate a range change pulse. This pulse shifts register 75 causing the over-range bit to go high. This bit being high causes all the ratio counters to lock up into an all zero state and inhibits any further action in register 73 or the ratio counters.

At any time during the counting process or after over-range is passed that the light intensity drops below 1 percent of maximum level, voltage comparator 59 will return to the high state and cause the display latches to latch up with the then current range and ratio count. As soon as voltage comparator 59 output rises the entire instrument will revert to an initialization mode preparing for the next timing. No manual reset is required.

A summary of the states of the present invention is as follows with the range indicated, the ratio counter preset count, the maximum count in that range before the next slower range is selected, frequency division number represented in the binary count of countdown shift register 75 during the state of that range, and the resulting count up frequency range output by frequency divider 77 during the state of that range:

| Range | Preset Count | Maximum Count | VCO Frequency Division | Counting Frequency |
|---|---|---|---|---|
| 1/1000 | 000 / 134 | | 3 | 1 – 100 KPPS |
| 1/500 | 067 / 134 | | 6 | .5 – 50 KPPS |
| 1/250 | 067 / 134 | | 12 | .25 – 25 KPPS |
| 1/125 | 067 / 136 | | 24 | .125 – 12.5 KPPS |
| 1/60 | 065 / 134 | | 50 | .06 – 6 KPPS |
| 1/30 | 067 / 134 | | 100 | .03 – 3 KPPS |
| 1/15 | 067 / 131 | | 200 | .015 – 1.5 KPPS |
| 1/8 | 070 / 134 | | 375 | 8 – 800 PPS |
| 1/4 | 067 / 134 | | 750 | 4 – 400 PPS |
| 1/2 | 067 / 134 | | 1500 | 2 – 200 PPS |
| 1 | 067 (1)000 | | 3000 | 1 – 100 PPS |
| OVER-RANGE | 000 | — | — | — — — |

The circuitry shown in FIGS. 1, 2, 3 and 4 indicate a method for practicing the invention for American National Standards Institute (ANSI) standard shutter speeds for which the vast majority of camera shutters are timed. The invention may be practiced for other groups of shutter speeds by the following calculations.

The maximum count for a given speed range $S_1$ is determined by the speed of the next slower speed range $S_2$. The maximum count forrnage $S_1$ is:

$$\text{Max Ratio Count } (S_1) = \frac{2 S_2}{S_1 + S_2}.$$

When this maximum ratio count is reached in range $S_1$, the range is shifted to range $S_2$ and a preset count loaded into the ratio counters:

$$\text{Preset Ratio Count } (S_2) = \frac{2 S_1}{S_1 + S_2}.$$

The countdown frequency division number for each speed range is selected by:

$$\text{Frequency Division Number} = \frac{(\text{VCO Max Frequency}) (\text{Range Speed})}{100}$$

The frequency division number for the fasted speed range encountered should be calculated and if it is not an integer number, then VCO Max Frequency should be varied as required to to produce the nearest integer number. The crystal controlled reference oscillator should be similarly changed.

The connections for displaying the count of the presettable counters are shown in FIG. 3 where the output of the ratio counters 79 and 81 are fed to digital displays 121 and 123 and the latching terminal is connected to voltage comparator 59 of FIG. 1.

In FIG. 4, the logic connections interfacing range indicating shift register 73 with a digital display is shown where the outputs of the register are fed through gated network 125 to displays 127–130. Latching of the display is controlled by the output of voltage comparator 59 of FIG. 1.

What is claimed is:

1. A method for measuring shutter speed in the camera comprising:
   a. positioning the shutter adjacent to a light source;
   b. activating the shutter causing a pulse of light to pass therethrough;
   c. sensing the intensity and duration of the light pulse;
   d. automatically displaying a standard shutter speed which most accurately represents the effective speed of the tested shutter; and
   e. displaying an error ratio relating the effective speed of the shutter tested to the standard speed display.

2. A method for measuring shutter speed according to claim 1 which further comprises displaying of the standard shutter speed and error ratio by means of digital readout.

3. A method for measuring shutter speed in a camera comprising:
   a. positioning the camera adjacent to a light source;
   b. activating the camera shutter so that a pulse of light passes therethrough;
   c. sensing the intensity and duration of the light pulse;
   d. generating a train of clock pulses for which the instantaneous frequency is proportional to the intensity of the light pulse;
   e. counting said clock pulses; and
   f. displaying the shutter speed as a function of the counted pulses.

4. A method for measuring shutter speed according to claim 3 wherein the shutter speed is displayed digitally.

5. A method for measuring shutter speed according to claim 3 wherein the light pulse sensing is at the focal plane of the camera.

6. A method for measuring the shutter speed in a camera comprising:
   a. positioning the camera adjacent to a light source;
   b. activating the camera shutter so that a pulse of light passes therethrough;
   c. sensing the intensity and duration of a light pulse at a point in the focal plane of the camera;
   d. generating a train of clock pulses for which the instantaneous frequency thereof is proportional to the instantaneous intensity of the light pulse;
   e. counting the train of clock pulses;
   f. automatically displaying a standard shutter speed which most accurately represents the effective speed of the tested shutter; and
   g. displaying an error ratio relating the measured effective shutter speed to the standard shutter speed display.

7. A method for measuring shutter speed according to claim 6 wherein the displaying of the standard shutter speed and the error ratio is performed digitally.

8. A method for measuring shutter speed according to claim 7 which further comprises varying the sensitivity of the sensing to accommodate different intensities of light sources.

9. A method of measuring shutter speed according to claim 1 which further comprises automatically resetting prior to a subsequent measurement.

10. A method for measuring shutter speed in a camera according to claim 9 which further comprises preventing erroneous readings when a timing period exceeds the unambiguous range of the instrument.

11. A method of measuring shutter speed according to claim 10 wherein the standard shutter speeds are that of the American National Standards Institute.

12. A system for testing the shutter of a camera comprising:
   a. a photodetector positioned at the focal plane of the camera;
   b. a variable threshold voltage comparator connected to the photodetector;
   c. a first oscillator;
   d. means for generating an initialization pulse fed by the variable threshold voltage comparator and the first oscillator;
   e. a countdown shift register fed by the initialization pulse generating means;
   f. a voltage controlled oscillator fed by the photodetector;
   g. means for dividing the frequency of the voltage controlled oscillator by a variable divisor, the variable divisor being generated from the output of the countdown shift register;
   h. a range shift register activated by the initialization pulse generating means;
   i. logic means for reloading the countdown shift register fed by the range shift register;
   j. a ratio counter fed by the frequency dividing means and activated by the initialization pulse generating means;
   k. logic means for reloading the ratio counter fed by the range shift register;
   l. means for generating a range change pulse to activate the range shift register, the range change pulse generating means being fed by the ratio counter and the range shift register; and
   m. a ratio display fed by the ratio counter and latched by the variable threshold voltage comparator.

13. A system for testing the shutter of a camera according to claim 12 which further comprises a range display fed by the range shift register and latched by the variable threshold voltage comparator.

14. A system for testing a shutter of a camera according to claim 13 which further comprises a variable gain amplifier interposed between the photodetector and both the voltage controlled oscillator and the variable threshold voltage comparator.

* * * * *